March 15, 1949. P. H. MORSE 2,464,339
BUTTER SLICER
Filed July 19, 1946 2 Sheets-Sheet 1
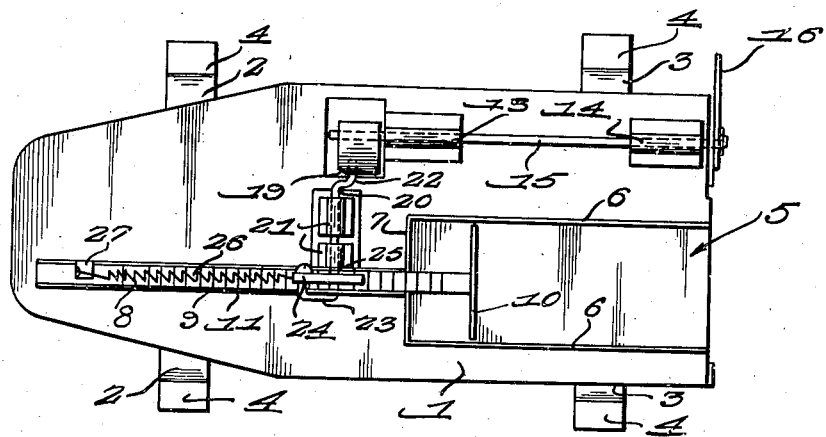
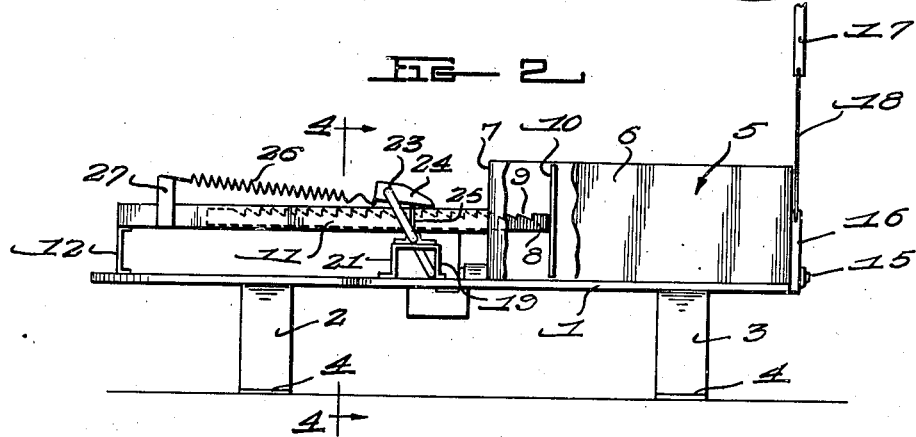
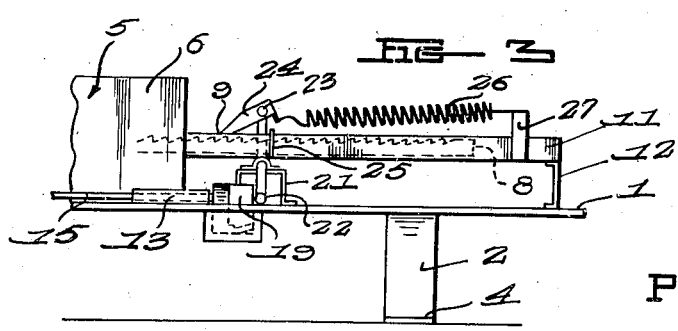
Inventor
PAUL H. MORSE
By *Clarence A. O'Brien and Harvey B. Jacobson*
Attorneys March 15, 1949.    P. H. MORSE    2,464,339
BUTTER SLICER
Filed July 19, 1946    2 Sheets-Sheet 2
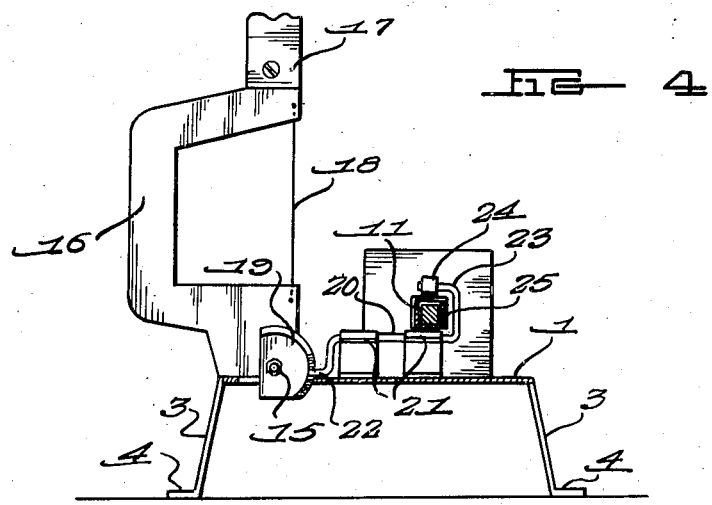
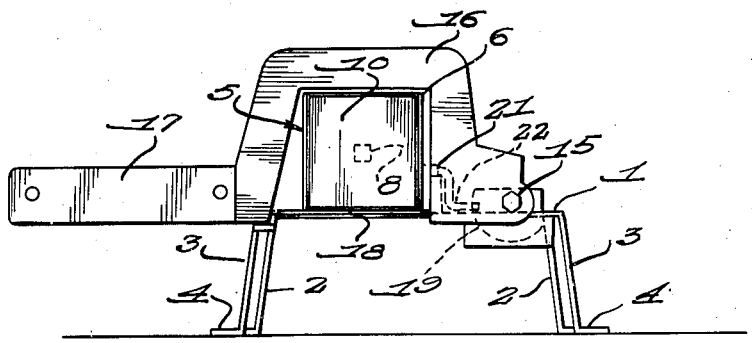
Inventor
PAUL H. MORSE
By Clarence A. O'Brien
and Harvey B. Jacobson
Attorneys Patented Mar. 15, 1949

2,464,339

UNITED STATES PATENT OFFICE 2,464,339

BUTTER SLICER

Paul H. Morse, Santa Barbara, Calif.

Application July 19, 1946, Serial No. 684,960

3 Claims. (Cl. 31—10)

This invention relates to improvements in butter slicers.

An object of the invention is to provide for home and restaurant use an improved portable butter slicer for cutting the small blocks of butter commonly sold in the markets into slices suitable for the table, and which will also slice cream cheeses and other foods.

Another object of the invention is to provide an improved butter slicer of simple construction, small size, and light weight which will be easy to handle, to operate and to keep clean.

A further object of the invention is to provide an improved butter slicer which will comprise a casing or receptacle to hold the butter to be sliced, a knife pivotally mounted and adapted to move through an arc across the front of said casing, and a cam operated means of advancing the block of butter toward the front of the casing during the initial part of the cutting stroke of said knife and of discontinuing such advancing just before the knife reaches the front of said casing with the remainder of the stroke being used to sever the slice of butter.

A still further object of the invention is to provide an improved butter slicer which will cut butter and other foods into slices of more than one thickness if desired.

Other objects will appear as the description proceeds.

In the accompanying drawings which form a part of this application,

Figure 1 is a plan view of my butter slicer;

Figure 2 is a side elevation thereof, a portion of the same being broken away to show the follower plate;

Figure 3 is a side elevation showing the cam, crank levers, rack bar and pawl, pawl spring and pawl releasing wire;

Figure 4 is a sectional view taken on the line 4—4 of Figure 2, and

Figure 5 is an end view of my butter slicer.

Like characters of reference are used throughout the following specification and the accompanying drawings to designate corresponding parts.

In carrying out the invention, there is provided a base plate 1 being supported by the pairs of outwardly extending depending legs 2 and 3, the same terminating in the lateral foot portions 4.

A receptacle or casing generally denoted by the reference numeral 5 is fixed on the upper surface of the base plate 1, and includes the opposed sides 6 and inner end 7 connected therebetween, said casing being open at its outer end.

The inner end 7 of the casing 5 is apertured to permit the rack bar 8 formed with the rack teeth 9 on its upper surface to pass freely therethrough. A follower plate 10 of a similar size to the cross sectional area of said casing 5 is integral with the forward end of the rack bar 8 and is adapted to be advanced from the inner to the outer ends of said casing 5 in a step by step manner by means hereinafter described.

A U-shaped channel rack guide 11 for the rack bar 8 is supported in the aperture through the end 7 of the casing 5 at its forward end, and is supported on the bracket 12 at its rear end, said bracket being suitably mounted on the body plate 1.

A pair of spaced bearings 13 and 14 are carried on the body plate 1 in parallel relation to the casing 5, and rotatably support the operating shaft 15 therebetween. The U-shaped knife 16 is secured to the forward end of the shaft 15, being formed with the handle portion 17, while a slicing wire or blade 18 is secured transversely across the parallel arms of said knife 16, to move across the forward end of said casing 5 through an arc when it is desired to sever a slice from the block of butter placed in the casing 5.

A rim cam 19 secured to the inner end of shaft 15 cooperates with crank arm 22 of shaft 20, the latter being placed at a right angle to shaft 15 and journaled on sub base 21. Oppositely disposed to crank arm 22 on shaft 20 is crank arm 23 and pivotally mounted on said crank arm 23 is pawl 24, the latter being adapted to engage the teeth on rack bar 8. Attached to the lower rear of pawl 24 is a spring 26 which serves by a backward and upward pull on said pawl to engage it with the above mentioned rack bar, and also to keep crank arm 22 in contact with cam 19 at all times.

An inverted U-shaped wire 25 is secured to the opposite sides of the channel guide 11 and extends transversely above same, its purpose being to lift pawl 24 out of engagement with the teeth on rack bar 8 when said pawl reaches its rearmost position thus freeing said rack bar so that it may be removed or its position shifted as desired.

The operation of the slicer is as follows:

Knife 16 is raised to its vertical or starting position at which time crank arm 22 is in contact with the low rim of cam 19, pawl 24 being then in its rearmost position and riding upon release wire 25 out of engagement with rack bar 8. Follower plate 10 is then moved by hand to the rear of casing 5 and a block of butter placed ahead of it. As knife 16 is started on its downward or cutting stroke the sloping face of cam 19 immediately forces crank arm 22 toward the rear, this in turn causes pawl 24 to move forward off release wire 25 into engagement with a tooth on rack bar 8 and to carry the latter ahead the distance of one tooth. By this time crank arm 22 rests on the high rim of cam 19 and the backward motion of the former ceases as, of course, then does the forward movement of rack bar 8, follower plate 10 and the block of butter, the latter now projecting beyond casing 5 a distance equal to the thickness of the slice to be cut. The cutting element 18 of knife 16 by this time has reached the butter and the remainder of the stroke severs the slice.

Where slices of greater thickness are desired two or more partial or advancing strokes may be used before completing the cutting stroke.

While the preferred embodiment of the instant invention has been illustrated and described, it will be understood that it is not intended to limit the scope of the invention thereto as many minor changes in detail of construction may be resorted to without departure from the spirit of the invention.

Having thus described my invention, what I claim as new and desire to secure by Letters Patent of the United States is:

1. A butter slicer including a base plate, supporting legs therefor, a casing thereon for holding a block of butter being closed at its inner end and open at its outer end, a shaft rotatably mounted on said base plate parallel to said casing, a slicing knife secured to the forward end of said shaft, a rim cam secured to the rear end of said shaft, a follower plate in said casing, a channel guide member, a rack bar slidably received in said guide member and integral with said follower plate for advancing said block of butter toward the open end of said casing in a step by step manner as slices are cut therefrom, and a pawl engageable with said rack bar and actuated by said cam for thrusting forward said follower plate.

2. A butter slicer including a base plate, supporting legs thereof, a casing thereon for holding a block of butter, being closed at its inner end and open at its outer end, a shaft rotatably mounted on said base plate parallel to said casing, a slicing knife secured to said shaft at the forward end of said casing, a rim cam secured to the rearward end of said shaft, a follower plate adapted to function within said casing, a channel guide member disposed in alignment with said casing, a rack bar slidably received in said guide member and integral with said follower plate, a shaft at a right angle to aforementioned shaft having oppositely disposed arms one engageable with said cam and the other carrying a spring retractable pawl engageable with the above mentioned rack bar, whereby the initial part of each cutting stroke of above mentioned slicing knife will cause said follower plate to advance the block of butter before it and the remainder of the cutting stroke will sever the butter which projects beyond the casing.

3. The subject matter as claimed in claim 2 and a release wire carried on said channel guide member and engageable with the under side of said pawl for releasing the same from said rack bar whenever aforementioned knife is in its vertical or starting position.

PAUL H. MORSE.

REFERENCES CITED

The following references are of record in the file of this patent:

UNITED STATES PATENTS

| Number | Name | Date |
| --- | --- | --- |
| 1,532,034 | Brdashaw | Mar. 31, 1925 |
| 1,687,809 | Trouvalis | Oct. 16, 1928 |